United States Patent [19]

Smith et al.

[11] Patent Number: 6,063,485
[45] Date of Patent: May 16, 2000

[54] FOAMED ARTICLES OF STYRENIC AND ACRYLIC POLYMERS BLEND

[75] Inventors: Peter John Smith, Northwich; Bernard John Cross, Middlesbrough, both of United Kingdom

[73] Assignee: Imperial Chemical Industies PLC, London, United Kingdom

[21] Appl. No.: 08/765,850

[22] PCT Filed: Jun. 6, 1995

[86] PCT No.: PCT/GB95/01304

§ 371 Date: May 8, 1997

§ 102(e) Date: May 8, 1997

[87] PCT Pub. No.: WO96/00256

PCT Pub. Date: Jan. 4, 1996

[30] Foreign Application Priority Data

Jun. 24, 1994 [GB] United Kingdom .................... 9412725
Jun. 24, 1994 [GB] United Kingdom .................... 9412726

[51] Int. Cl.[7] .................................. C08J 9/34; B32B 9/00
[52] U.S. Cl. ........................... 428/318.4; 521/51; 521/79; 521/81; 521/139
[58] Field of Search ................................ 521/51, 79, 81, 521/139; 428/318.4

[56] References Cited

U.S. PATENT DOCUMENTS

| 3,903,023 | 9/1975 | Boutillier ................................. | 521/139 |
| 4,196,267 | 4/1980 | Watanabee et al. . | |
| 4,925,606 | 5/1990 | Francis ..................................... | 521/139 |
| 4,983,639 | 1/1991 | Hahn et al. ............................. | 521/139 |
| 4,990,540 | 2/1991 | Hahn et al. ............................. | 521/139 |

FOREIGN PATENT DOCUMENTS 1 210 672  10/1970  United Kingdom .

OTHER PUBLICATIONS

Database WPI, Week 9208, Derwent Publications Ltd., London, GB; AN 92:061823 'Foamed polystyrene with uniform, fine cell structure.' & JP,a,4 008 738 (CHISSO CORP.) Jan. 13, 1992, see abstract.

*Primary Examiner*—Morton Foelak

[57] ABSTRACT

Foamed articles having a closed cell structure formed from a polymer blend comprising at least 50% by weight of a styrenic polymer and up to 50% by weight of an acrylic polymer which has an average molecular weight which is less than 90% of that of the styrenic polymer which are significantly less dense than such articles prepared from the styrenic polymer alone.

19 Claims, No Drawings

FOAMED ARTICLES OF STYRENIC AND ACRYLIC POLYMERS BLEND

The present invention relates to foamed articles formed from a blend of a styrenic polymer and at least one acrylic polymer.

It is well known that polystyrene may be readily foamed by a variety of processes, including extrusion. The density of such industrially produced polystyrene foam, absent any particular treatment is usually of the order of 32 kg.m$^{-3}$.

GB 2146941 discloses the preparation of a polystyrene foam by an extrusion process.

EP 0411923 is directed towards the preparation of polystyrene foam having a density from 32 to 160 kg.m$^{-3}$ using an extrusion process in which liquid carbon dioxide is employed as a blowing agent.

Low density polystyrene foam, i.e. foam having a density less than 32 kg.m$^{-3}$ is difficult to manufacture and typically requires that the original foam is either foamed directly into a sub atmospheric pressure environment or else is subjected to some form of controlled re-expansion, for example U.S. Pat. No. 4,552,904 discloses the preparation of a polystyrene foam having a density of less than 32 kg.m$^{-3}$ by the re-expansion of an extruded foam. Such requirements add to the complexity of the foam making process and the expense of the low density foam with a consequence that such low density polystyrene foam is not widely available even though the benefits of using such foam in the building and other industries is well recognised.

It is an object of the present invention to provide a relatively low density polystyrene foam using a conventional foaming method such as extrusion, without the need to use re-expansion or an other such technique.

Accordingly, in a first aspect the present invention provides a foamed article having a closed cell structure formed from a polymer blend comprising at least 50% by weight of a styrenic polymer and up to 50% by weight of an acrylic polymer which has an average molecular weight which is less than 90% of that of the styrenic polymer.

The styrenic polymer may be a homopolymer or a copolymer of at least one of styrene, methyl styrene and acrylonitrile. Preferably at least 50% of the monomer units of the styrenic polymer are derived from styrene and in particular the styrenic polymer is a homopolymer of styrene.

Suitably, the styrenic polymer has an average molecular weight from 180000 to 250000, and preferably from 180000 to 230000, for example about 200000.

The acrylic polymer may be a homopolymer or a copolymer of at least one $C_{1-5}$alkyl ($C_{1-4}$alkyl)acrylate, for example methyl methacrylate, methyl acrylate, ethyl acrylate, propyl acrylate and butyl acrylate. Preferably the acrylic polymer is a copolymer, particularly a copolymer containing a methacrylate, e.g. methyl methacrylate, and an acrylate, such as methyl acrylate or ethyl acrylate. The acrylic polymer preferably contains from 50 to 100%, particularly from 80 to 95, and especially 90 to 95 by weight of monomer units which are derived from a methacrylate, e.g. methyl methacrylate, with the balance of the monomer units being derived from at least one acrylate. The acrylic polymer has an average molecular weight which is less than 90%, preferably less than 80%, particularly less than 75% and especially from 50 to 60%, that of the styrenic polymer. Suitably, the acrylic polymer has an average molecular weight from 50000 to 180000, preferably from 50000 to 150000 and particularly from 80000 to 140000.

The foamed article has a closed cell structure. Typically, the closed cells have sides from 100 to 1000 $\mu$, particularly from 100 to 900 $\mu$ and especially from 100 to 600 $\mu$.

The average density of the foamed article is typically from 5 to 40%, preferably from 10 to 40 and particularly from 20 to 35% less than that of a similarly foamed article formed from the styrenic polymer alone.

The properties of the foamed article, such as thermal conductivity, remain comparable, although consistently lower, to those of a similarly foamed article formed from the styrenic polymer alone. Typical thermal conductivities of foamed articles immediately after manufacture thus range from 20 to 24 mW.(mK)$^{-1}$, for example about 21 mW.(mK)$^{-1}$ and rise, after equilibrating with the environment, to range from 25 to 27 mW.(mK)$^{-1}$, for example about 26 mW.(mK)$^{-1}$. Similarly foamed styrenic polymer would have a thermal conductivity as manufactured of about 24 mW.(mK)$^{-1}$ which rises to about 27 mW.(mK)$^{-1}$ with time.

The compression strength of the foamed article does reduce with increasing acrylic polymer content. However, at an acrylic polymer content of 50% or less, the compression strength may be maintained from 150 to 260 kPa.

In use the foamed article may be laminated onto any suitable support material, e.g. plasterboard, wood or an other plastics structure, in order to form an insulated building material and the like.

The foamed article may be formed on conventional extrusion equipment. When so formed, there is a variation in density across a cross-section of the foamed article from a surface of the foamed article through to substantially the centre of the foamed article which is normal to the axis of extrusion. The variation in density follows a typical "bath-tub" curve, i.e. the foamed article is less dense at the centre than at the surface. Although the bath-tub curve is typical of extrusion foamed material, the observed average densities have hitherto only been attainable by foam extrusion of conventional styrenic polymers into a vacuum or by re-expansion, e.g. by heating in air or steam, in which latter case the bath-tub curve becomes inverted due to the tendency for only the surface region of the foam to be re-expanded.

Suitable blowing agents are those typical of the art. Preferably the blowing agent is a physical blowing agent and therefore includes hydrocarbons such as propane, butane, pentane, isopentane, cyclopentane and heptane; halogenated hydrocarbons such as dichlorodifluoromethane, dichlorotetrafluoroethane, trichlorofluoromethane, difluorochloroethane and tetrafluoroethane; alcohols such as methanol; and inert gases such as nitrogen and carbon dioxide. The quantity of the blowing agent used will depend, at least in part, on the composition of the polymer blend and the desired density of the foamed article. Typical levels range from 2 to 20 kg of blowing agent per 100 kg of polymer. Suitably, a hydrocarbon blowing agent, such as butane, is used at a level from 2 to 8, preferably from 4 to 6 kg per 100 kg of polymer, whereas a halogenated hydrocarbon, such as R22, is used at a level from 5 to 20, preferably from 10 to 15 kg per 100 kg of polymer. Employing additional blowing agent above these levels usually does not result in any further reduction of density.

The following examples further illustrate the present invention.

In these examples the indicated polymer blend was melted and mixed with a blowing agent, consisting of 60% by weight of R22 and 40% by weight of R142b, in a heated conventional extruder and thereafter extruded to atmosphere through a die slot having dimensions 3 mm by 300 mm.

The difference in average density is with respect to a foamed homopolymer of styrene produced on the same equipment, having an average molecular weight of about 200000 and which was also used in the polymer blends prepared in the following examples.

The acrylic polymers used in the polymer blends were all commercially available materials.

EXAMPLE 1

In this example, the acrylic polymer that was used was a copolymer of methyl methacrylate with 5% ethyl acrylate (EA) having an average molecular weight of 129000.

| Example | % Acrylic Polymer in Blend | Density Difference (%) |
|---------|----------------------------|------------------------|
| 1a      | 20                         | −17                    |
| 1b      | 50                         | −21                    |

It is therefore evident that increasing the proportion of acrylic polymer in the blend reduces the density of the foamed article.

EXAMPLE 2

In this example various acrylic polymers were used having different molecular weights but which were all copolymers of methyl methacrylate with 3% ethyl acrylate (EA). The polymer blend contained 80% w/w of styrene homopolymer and 20% w/w of the acrylic polymer.

| Example         | Density Difference (%) | Molecular Weight |
|-----------------|------------------------|------------------|
| 2a              | −12                    | 85000            |
| 2b              | −9                     | 129000           |
| 2c (Comparative)| +11                    | 181000           |

It is therefore evident that reducing the molecular weight of the acrylic polymer also leads to a reduction in the density of the foamed article.

EXAMPLE 3

In this example various acrylic polymers were used having approximately the same molecular weight. The acrylic polymers were again copolymers of methyl methacrylate and ethyl acrylate but with different proportions of the two comonomers. The polymer blend again contained 80% w/w of styrene homopolymer and 20% w/w of the acrylic polymer.

| Example | Ethyl Acrylate (%) | Density Difference (%) | Molecular Weight |
|---------|--------------------|------------------------|------------------|
| 3a      | 3.0                | −8                     | 129000           |
| 3b      | 5.0                | −25                    | 129000           |
| 3c      | 7.5                | −28                    | 121000           |

It is therefore shown that increasing the proportion of acrylate monomer in the acrylic polymer leads to a reduction in the density of the foamed article.

EXAMPLE 4

In this example various acrylic polymers were used which were copolymers of methyl methacrylate with methyl acrylate (MA) or butyl acrylate (BA). The polymer blend again contained 80% w/w of styrene homopolymer and 20% w/w of the acrylic polymer.

| Example | Acrylate | (%) | Density Difference (%) | Molecular Weight | Blowing Agent per 100 kg |
|---------|----------|-----|------------------------|------------------|--------------------------|
| 4a      | MA       | 4.5 | −29                    | 136000           | 11.1                     |
| 4b      | BA       | 1   | −22                    | 137000           | 10.3                     |

It can therefore be seen that the use of low levels of a higher alkyl acrylate as a comonomer in the acrylic polymer can produce a significant reduction in density of the foamed article and that such a reduction can also be achieved by using lower levels of blowing agent.

EXAMPLE 5

In this example an acrylic polymer consisting of a copolymer of methyl methacrylate and 5% MA was used having a molecular weight of 120000 at various addition levels and with varying amounts of the blowing agent previously used. The slot die dimensions were 3 mm by 400 mm.

| Example | % Acrylic Polymer in Blend | Blowing Agent per 100 kg | Density Difference (%) |
|---------|----------------------------|---------------------------|------------------------|
| 5a      | 10                         | 7.9                       | −4.9                   |
| 5b      | 10                         | 8.5                       | −7.2                   |
| 5c      | 20                         | 8.5                       | −8.6                   |
| 5d      | 20                         | 9.3                       | −12.9                  |
| 5e      | 20                         | 9.9                       | −16.9                  |
| 5f      | 20                         | 10.3                      | −18.9                  |
| 5g      | 20                         | 10.6                      | −21.2                  |
| 5h      | 20                         | 11.6                      | −23.2                  |
| 5i      | 20                         | 12.7                      | −22.9                  |

Again it can be seen that increasing the % of acrylic polymer in the blend (Examples 5b and 5c) further reduces the density of the foam. Also, as the amount of blowing agent employed increases the density reduction also increases up to a limit beyond which little further reduction in density occurs.

The cell size of the Example 5i was approximately 150 $\mu$ and was the same as that of the reference foam of homopolymer styrene.

The thermal conductivity of the foam produced in Example 5i was initially about 21 mW.(mK)$^{-1}$ on manufacture which rose over a period of 9 weeks, when held at 70° C., to about 26 mW.(mK)$^{-1}$. A comparative foam of styrenic polymer had an initial thermal conductivity of about 24 mW.(mK)$^{-1}$ which rose over a 9 week period, when held at 70° C., to about 27 mW.(mK)$^{-1}$.

We claim:

1. A foamed article having a closed cell structure formed from a polymer blend comprising at least 50% by weight of a styrenic polymer and up to 50% by weight of an acrylic polymer which is a homopolymer or a copolymer of at least one $C_{1-8}$alkyl ($C_{0-4}$alkyl)-acrylate, which has an average molecular weight which is less than 90% of that of the styrenic polymer.

2. A foamed article as claimed in claim 1 wherein at least 50% of the monomer units of the styrenic polymer are derived from styrene.

3. A foamed article as claimed in claim 1 wherein the styrenic polymer is a homopolymer of styrene.

4. A foamed article as claimed in claim 1 wherein the styrenic polymer has an average molecular weight from 180000 to 250000.

5. A foamed article as claimed in claim 1 wherein the acrylic polymer contains from 50 to 100% by weight of monomer units which are derived from a methacrylate with the balance of the monomer units being derived from at least one acrylate.

6. A foamed article as claimed in claim 1 wherein the closed cells have sides in the range from 100 to 1000 μ.

7. A foamed article as claimed in claim 1 having a density which is from 5 to 40 % less than that of a similarly foamed article formed from the styrenic polymer alone.

8. A foamed article as claimed in claim 1 wherein there is a variation in density across a cross-section of the foamed article from a surface of the foamed article through to substantially the centre of the foamed article such that the foamed article is less dense at the centre than at the surface.

9. A laminate comprising a foamed article as defined in claim 1 supported on a support material selected from plasterboard, wood or an other plastics structure.

10. A method of using the laminate as claimed in claim 9 which comprises forming an insulated building material from said laminate.

11. A foamed article having a closed cell structure formed from a polymer blend comprising at least 50% by weight of a styrenic polymer which has an average molecular weight from 180,000 to 250,000 and up to 50% by weight of an acrylic polymer which is a homopolymer or a copolymer of at least one $C_{1-8}$ alkyl ($C_{0-4}$ alkyl) acrylate which has an average molecular weight in the range from 50,000 to 180,000, wherein the average molecular weight of the acrylic polymer is less than 90% of that of the styrenic polymer.

12. A foamed article as claimed in claim 11 wherein at least 50% of the monomer units of the styrenic polymer are derived from styrene.

13. A foamed article as claimed in claim 11 wherein the styrenic polymer is a homopolymer of styrene.

14. A foamed article as claimed in claim 11 wherein the acrylic polymer contains from 50 to 100% by weight of monomer units which are derived from a methacrylate with the balance of the monomer units being derived from at least one acrylate.

15. A foamed article as claimed in claim 11 wherein the closed cells have sides in the range from 100 to 1,000 microns.

16. A foamed article as claimed in claim 11 having a density which is from 5 to 40% less than that of a similarly foamed article formed from the styrenic polymer alone.

17. A foamed article as claimed in claim 11 wherein there is a variation in density across a cross-section of the foamed article from a surface of the foamed article through to substantially the center of the foamed article such that the foamed article is less dense at the center than at the surface.

18. A laminate comprising a foamed article as claimed in claim 11 supported on a support material selected from plasterboard, wood or an other plastics structure.

19. A method of using the laminate as claimed in claim 11 which comprises forming an insulated building material from said laminate.

* * * * *